US009608840B2

(12) United States Patent
Ravi et al.

(10) Patent No.: US 9,608,840 B2
(45) Date of Patent: Mar. 28, 2017

(54) VIRTUALIZED ON-DEMAND SERVICE DELIVERY BETWEEN DATA NETWORKS VIA SECURE EXCHANGE NETWORK

(71) Applicant: Cisco Technology, Inc., San Jose, CA (US)

(72) Inventors: Gunupuree Ravi, Bangalore (IN); Sudhish Ullattil, Bangalore (IN); Vivek Vishnoi, Cupertino, CA (US); Sahil Sharma, Bangalore (IN); Amit Sachan, Kanpur (IN)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 14/499,687

(22) Filed: Sep. 29, 2014

(65) Prior Publication Data

US 2016/0094363 A1 Mar. 31, 2016

(51) Int. Cl.
*H04L 12/28* (2006.01)
*H04L 12/46* (2006.01)
(Continued)

(52) U.S. Cl.
CPC ............ *H04L 12/46* (2013.01); *G06F 21/57* (2013.01); *H04L 63/0272* (2013.01); *H04L 63/08* (2013.01)

(58) Field of Classification Search
CPC ... H04L 12/46; H04L 63/0272; H04L 67/104; H04L 63/08
See application file for complete search history.

(56) References Cited

U.S. PATENT DOCUMENTS

2002/0019932 A1 2/2002 Toh et al.
2005/0125528 A1* 6/2005 Burke, II ............... H04L 63/10
709/223
(Continued)

FOREIGN PATENT DOCUMENTS

EP 0790751 A2 8/1997

OTHER PUBLICATIONS

Wikipedia, "B2B Gateway", [online], Nov. 3, 2013, [retrieved on Aug. 11, 2014]. Retrieved from the Internet: <URL: http://en.wikipedia.org/w/index.php?title=B2B_Gateway&printable=yes>, pp. 1-2.

(Continued)

*Primary Examiner* — Ayaz Sheikh
*Assistant Examiner* — Hai-Chang Hsiung
(74) *Attorney, Agent, or Firm* — Leon R. Turkevich

(57) ABSTRACT

In one embodiment, a method comprises determining, by a network edge device in a first autonomous network, whether a second network edge device in a second autonomous network is authorized to submit a service request to the first autonomous network, the service request associated with one of providing or consuming an identified network-based service; identifying, by the network edge device within the first autonomous network, a third network edge device in a third autonomous network and identified as responsive to the service request for the identified network-based service; and sending instructions for establishing a secure communications between the second network edge device and the third network edge device via a data network distinct from the first, second, or third autonomous networks, for establishment of the identified network service between the second autonomous network and the third autonomous network via the data network.

18 Claims, 6 Drawing Sheets

(51) Int. Cl.
    *H04L 29/06*     (2006.01)
    *G06F 21/57*     (2013.01)

(56) References Cited

U.S. PATENT DOCUMENTS

| | | | | |
|---|---|---|---|---|
| 2006/0233166 | A1* | 10/2006 | Bou-Diab | H04L 63/08 370/389 |
| 2006/0233180 | A1* | 10/2006 | Serghi | H04L 29/06 370/401 |
| 2008/0126501 | A1* | 5/2008 | Chen | G06F 11/2028 709/209 |
| 2013/0018999 | A1* | 1/2013 | Merrill | H04L 41/5041 709/223 |
| 2014/0317293 | A1 | 10/2014 | Shatzkamer | |

OTHER PUBLICATIONS

Wikipedia, "Software-defined networking", [online], Aug. 6, 2014, [retrieved on Aug. 11, 2014]. Retrieved from the Internet: <URL: http://en.wikipedia.org/w/index.php?title=Software-defined_networking&printable=yes>, pp. 1-22.

* cited by examiner

VIRTUALIZED ON-DEMAND SERVICE DELIVERY BETWEEN DATA NETWORKS VIA SECURE EXCHANGE NETWORK

TECHNICAL FIELD

The present disclosure generally relates to distributed computing services. More particularly, the present disclosure relates to a secure exchange network providing virtualized on-demand service delivery between a service provider network and a service consumer network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Businesses have invested heavily in implementing information technology (IT) infrastructure in the form of private networks (e.g., local area networks or enterprise-wide wide area networks). Such businesses to date have deployed substantial network assets to protect their private networks from external Internet-based attacks, including deploying Demilitarized Zones (DMZ) between the private networks and the Internet, establishing virtual private network (VPN) gateways for secure communication between the private networks and external network devices via the Internet, etc.

Attempts to improve service delivery between businesses have included reliance on proprietary business-to-business (B2B) integration solutions between private networks, relocating an IT infrastructure from a private network into a virtualized (e.g., "cloud") infrastructure, or software-defined-network (SDN) solutions.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
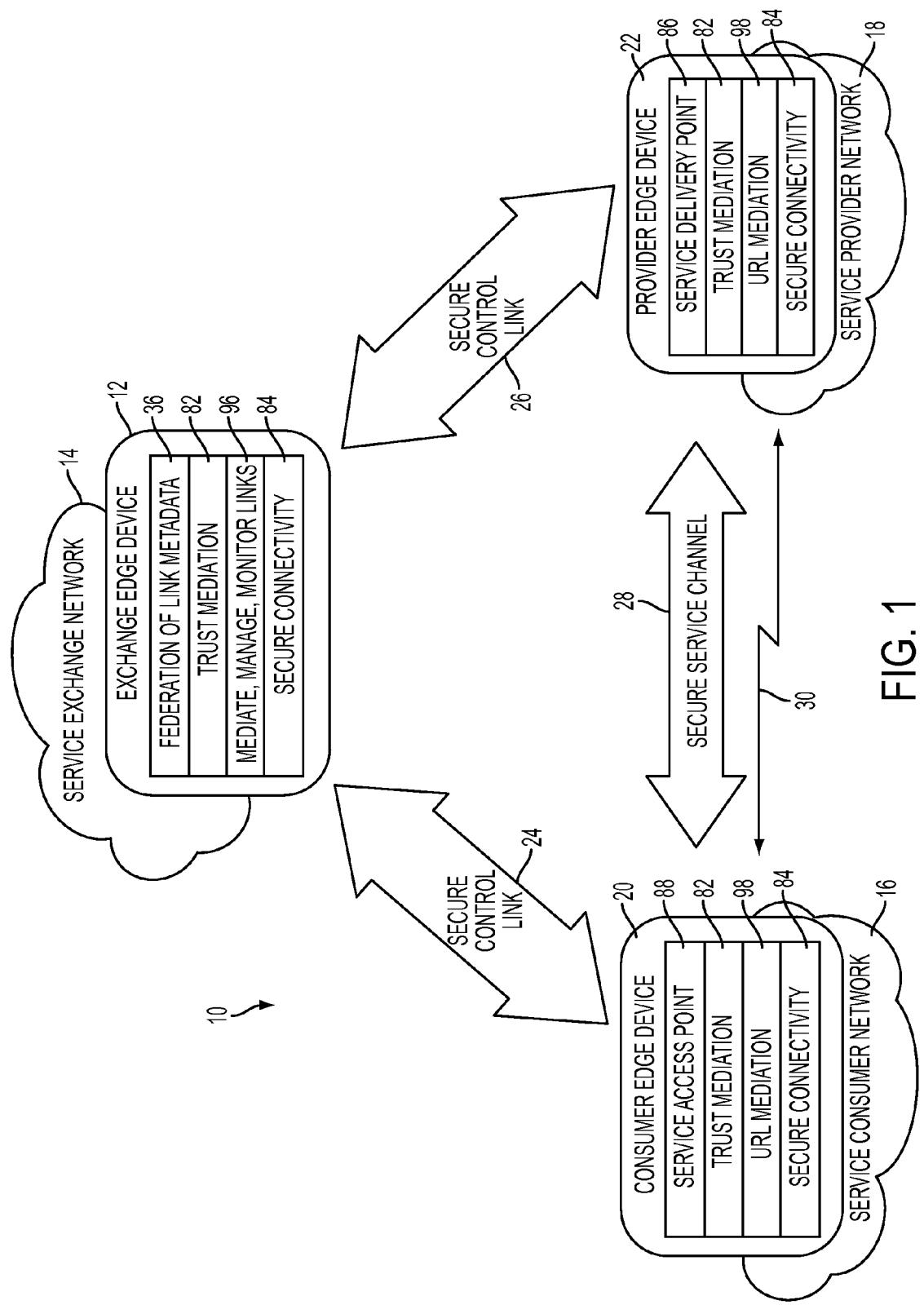
FIG. 1 illustrates an example system having an apparatus in one autonomous network enabling establishment of an identified network service between a second autonomous network and a third autonomous network via a distinct data network, according to an example embodiment.

In one embodiment, a method comprises determining, by a network edge device in a first autonomous network, whether a second network edge device in a second autonomous network is authorized to submit a service request to the first autonomous network, the service request associated with one of providing or consuming an identified network-based service; identifying, by the network edge device within the first autonomous network, a third network edge device in a third autonomous network and identified as responsive to the service request for the identified network-based service; and sending instructions for establishing a secure communications between the second network edge device and the third network edge device via a data network distinct from the first, second, or third autonomous networks, for establishment of the identified network service between the second autonomous network and the third autonomous network via the data network.

In another embodiment, an apparatus comprises a device interface circuit, and a processor circuit. The device interface circuit is configured for communications inside and outside a first autonomous network. The apparatus is configured for operation as a network edge device in the first autonomous network. The processor circuit is configured for determining whether a second network edge device in a second autonomous network is authorized to submit a service request to the first autonomous network, the service request associated with one of providing or consuming an identified network-based service. The processor circuit also is configured for identifying, within the first autonomous network, a third network edge device in a third autonomous network and identified as responsive to the service request for the identified network-based service. The processor circuit also is configured for sending instructions for establishing a secure communications between the second network edge device and the third network edge device via a data network distinct from the first, second, or third autonomous networks, for establishment of the identified network service between the second autonomous network and the third autonomous network via the data network.

In another embodiment, logic is encoded in one or more non-transitory tangible media for execution by a machine and when executed by the machine operable for: determining, by a network edge device in a first autonomous network, whether a second network edge device in a second autonomous network is authorized to submit a service request to the first autonomous network, the service request associated with one of providing or consuming an identified network-based service; identifying, by the network edge device within the first autonomous network, a third network edge device in a third autonomous network and identified as responsive to the service request for the identified network-based service; and sending instructions for establishing a secure communications between the second network edge device and the third network edge device via a data network distinct from the first, second, or third autonomous networks, for establishment of the identified network service between the second autonomous network and the third autonomous network via the data network.

DETAILED DESCRIPTION

Particular embodiments enable an apparatus, deployed as a network edge device (e.g., an "exchange edge device") in a first autonomous network, to provide an endpoint for a service exchange network providing on-demand delivery of secure and trusted network-based services between one or more consumer devices in a second autonomous network (e.g., a "service consumer network") and one or more provider devices in a third autonomous network (e.g., a "service provider network"). The exchange device enables on-demand delivery of network-based services between the service consumer network and a service provider network, without the necessity of any modification of existing IT infrastructure, any migration of services to a cloud-based topology, or deployment of proprietary integration infrastructure.

FIG. 1 is a diagram illustrating an example network 10 having one or more exchange edge devices 12 in a service exchange network 14 for establishing an identified network service between a service consumer network 16 and a service provider network 18, according to an example embodiment. The exchange edge device 12 of the service exchange network 14 can send instructions to a network edge device (e.g., a "consumer edge device") 20 of the service consumer network 16 and/or a network edge device (e.g., "provider edge device") 22 of the service provider network 18 via secure control links 24 and 26, enabling the consumer edge device 20 and the provider edge device 22 to establish secure communications via a secure service channel 28 overlying a secure peer-to-peer network link (e.g., a virtual private network (VPN) using IPSec or SSL) 30. The secure service channel 28 between the consumer edge device 20 and the provider edge device 22 can enable establishment of the secure and trusted network-based services between the service consumer network 16 and the service provider network 18.

Hence, the particular embodiments enable establishment of a secured, virtualized, reliable network topology where a service provider network 18 can provide on-demand network-based services based on authorized "publishing", via the service exchange network 14, of a service request for providing the network-based services. Moreover, the provider edge device 22 serves as the "point of delivery" for the service provider network 18 providing the on-demand network-based services to any consumer; hence, the service provider network 18 can supply the network-based services using existing IT infrastructure that resides within administrative control of its autonomous network 18.

Similarly, a service consumer network 16 can search, advertise, and/or "bid" for secure and trusted on-demand network-based services, within a secure and trusted virtualized network ecosystem, based on submitting an authorized "service request" via the service exchange network 14. The exchange edge device 12 can send instructions to enable the service consumer network 16 to acquire, via a secure connection 30 providing a secure service channel 28 with a trusted provider edge device 22, the on-demand network-based services. Moreover, the consumer edge device 20 serves as the "point of consumption" for any network-based services supplied to the service consumer network 16; hence, the service consumer network 16 can consume the on-demand network-based services within the existing IT infrastructure residing within administrative control of its autonomous network 16. Any monetary transactions associated with the delivery of the network-based service responsive to the service request can be controlled exclusively by the service exchange network 14, based on the trust relationship established between the service consumer network 20 and the service exchange network 14, and between the service provider network 18 and the service exchange network 14.

Hence, the example embodiments enable one or more exchange edge devices 12 to establish on-demand and secure peer-to-peer connections 24 and 26 between a consumer edge device 20 and a provider edge device 22 for administrative control of on-demand network-based services, ensuring the administrative, financial, and secure control of transactions associated with delivering the network service to the service consumer network 16 remains exclusively under the administrative control of the service exchange network 14. The example embodiments also enable the one or more exchange edge devices 12 to instruct the consumer edge device 20 and the provider edge device 22 to establish the secure service channel 28 overlying the secure peer-to-peer (or "host-to-host") network link 30, enabling the provider edge device 22 to execute a service delivery point 86 that retains exclusive administrative control of the "generation" and "output" of the network service from the administrative domain of the service provider network 18; the secure service channel 28 also enables the consumer edge device 20 to execute a service access point 88 that retains exclusive administrative control of the consumption of the network service from the administrative domain of the service consumer network 16.

Figure 2:
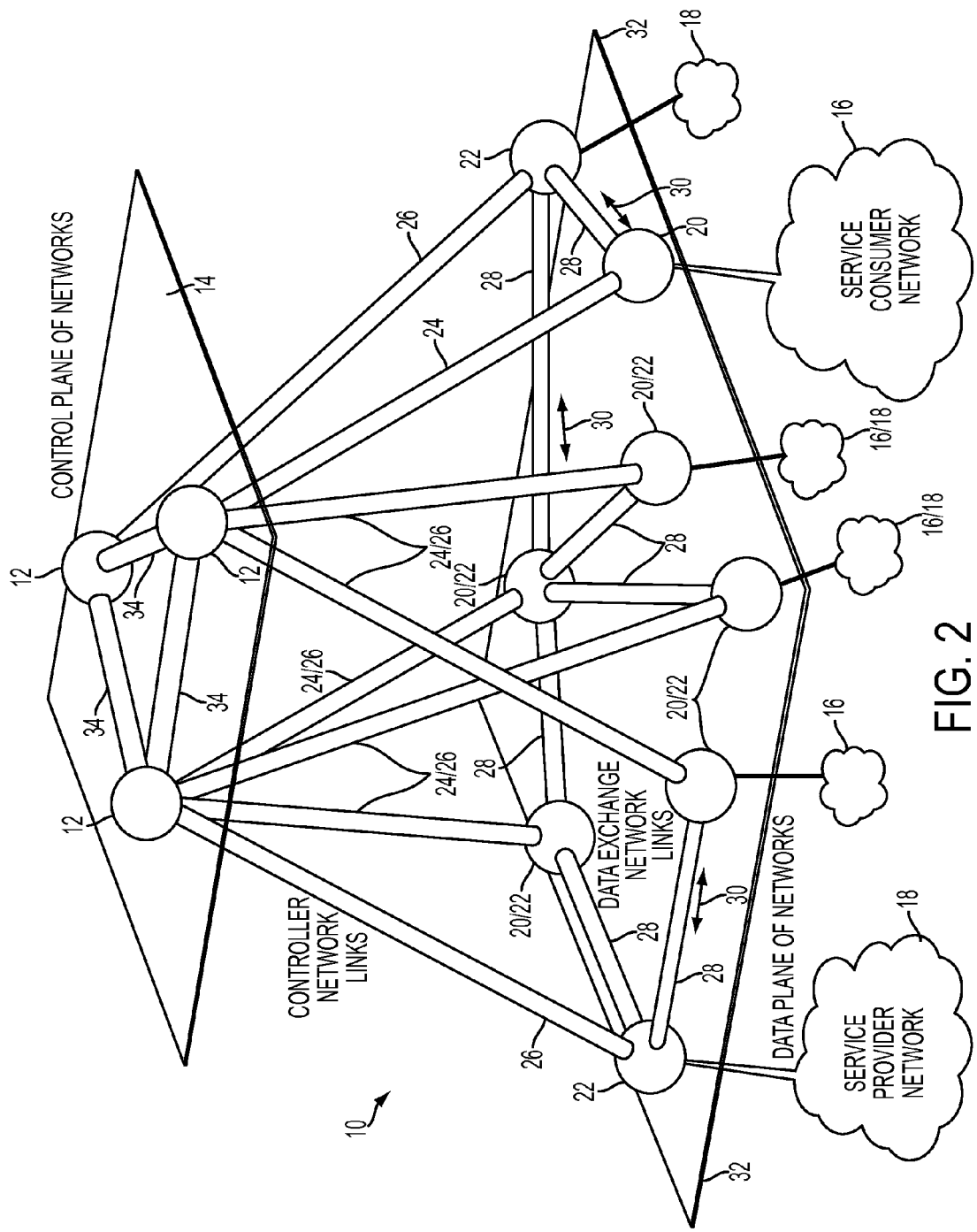
FIG. 2 illustrates in further detail the autonomous networks of FIG. 1, including edge devices for establishing secure channels across autonomous networks, according to an example embodiment.

FIG. 2 illustrates in further detail the autonomous networks 14, 16, and 18 of FIG. 1, including edge devices 12, 20, and 22 for establishing secure channels 24, 26, and/or 28 across the autonomous networks, according to an example embodiment. As illustrated in FIG. 2, the secure service channels 28 are established over the secure peer-to-peer network links 30 within a data network 32 that is independent and distinct from any of the autonomous networks 14, 16, or 18. An example data network 32 can be a wide area network such as the Internet. The reference to "16/18" refers to an autonomous network that can be a service consumer network 16 and/or a service provider network 18 (e.g., a single autonomous network or autonomous system providing one network service and consuming another network service); hence, the reference "20/22" refers to the associated consumer edge device 20 and/or provider edge device 22, and the reference "24/26" refers to the associated secure control link 24 and/or 26. As apparent from the foregoing, the distinction between reference numerals 16 vs. 18, 20 vs. 22, or 24 vs. 26 is only with respect to whether the associated entity for a service provider or a service consumer.

As illustrated in FIG. 2, the service exchange network 14 can include a plurality of exchange edge devices 12, where each exchange edge device 12 can be configured for establishing one or more secure channels 24 with one or more consumer edge devices 20 and/or one or more secure channels 26 with one or more provider edge devices 22.

Each exchange edge device 12 in the service exchange network also can include one or more exchange links 34 for peer-to-peer communications between the exchange edge devices 12. As described in further detail below, each exchange edge device 12 can obtain metadata from transactions with a connected consumer edge device 20 via the corresponding secure control link 24, or from transactions with a connected provider edge device 22 via the corresponding secure control link 26.

Each exchange edge device 12 can manage transactions with a connected "requestor edge device", and can send instructions to the requestor edge device for establishing a secure communications with a "responder edge device". As described herein, each exchange edge device 12 can receive a service request from a "requestor edge device" (e.g., the consumer edge device 20 and/or provider edge device 22) via the corresponding link 24 and/or 26; the exchange edge device 12 also can determine whether a "responder edge device" (e.g., another provider edge device 22 and/or another consumer edge device 20) is available to respond to the service request from the requestor edge device. Example transactions can include activating a requestor edge device within the service exchange network 14, receiving a service request from the requestor edge device, or sending instructions to the requestor edge device for establishing the identified network service between the requestor edge device and the responder edge device.

The metadata obtained by the exchange edge device 12 from each transaction with a requestor edge device (e.g., the consumer edge device 20 and/or provider edge device 22) via the corresponding link 24 and/or 26 can be distributed by the exchange edge device 12 to other exchange edge devices 12 via the exchange links 34. Hence, the exchange edge devices 12 of FIG. 2 can establish a distributed directory (e.g. 36 of FIGS. 1 and 5) of network-based services 38 (illustrated in FIG. 5), enabling each exchange edge device 12 to determine whether the distributed directory 36 identifies a responder edge device, based on whether the distributed directory 36 identifies a matching service from a counterparty. As apparent from the foregoing, the "counterparty" is identifiable as another requestor edge device having previously submitted its own service request for the same identified network service, but having the opposite service role (i.e., a service consumer is the "counterparty" for the service provider for the same network service); hence, a provider edge device 22 advertising a network-based service "A" based on submitting a service request to its exchange edge device 12 (e.g., "P-A" advertising the availability of the network-based service "A") can be identified as the "responder edge device" for a second service request submitted by a consumer edge device 20 (e.g., "C-A" requesting the consumption of the network-based service "A").

Hence, each exchange edge device 12 can identify a responder edge device that is responsive to a received service request, based on accessing the distributed directory 36; if no responder edge device is available yet, the exchange edge device 12 can store metadata associated with the service request in the distributed directory 36, enabling another exchange edge device 12 to identify metadata as responsive to another service request by a counterparty consumer or provider network. The storage of metadata in the distributed directory 36 for each transaction encountered by the exchange edge device 12 enables the "federation" of information related to service, network and edge devices present on the entire network eco-system of the network 10. Hence, the distributed directory 36 can serve as a centralized service catalog of available providers and/or consumers for identifiable network-based services 38.

Figure 3:
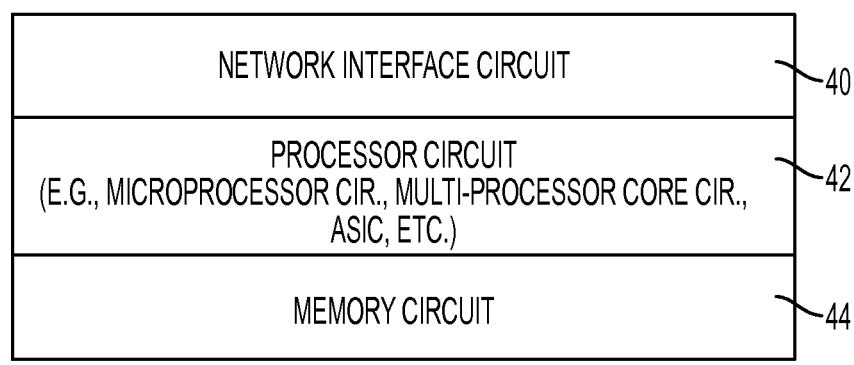
FIG. 3 illustrates an example implementation of any one of the edge devices of FIG. 1 or 2, according to an example embodiment.

FIG. 3 illustrates an example implementation of any one of the edge devices 12, 20, and/or 22 of FIG. 1 or 2, according to an example embodiment. Each edge device (i.e., apparatus) 12, 20, and/or 22 is a physical machine (i.e., a hardware device) configured for implementing network communications with other physical machines 12, 20, and/or 22 in the network 10. The term "configured for" or "configured to" as used herein with respect to a specified operation refers to a device and/or machine that is physically constructed and arranged to perform the specified operation. Hence, the apparatus 12, 20, and/or 22 is a network-enabled machine implementing network communications via the network 10.

Each apparatus 12, 20, and/or 22 can include a device interface circuit 40, a processor circuit 42, and a memory circuit 44. The device interface circuit 40 can include one or more distinct physical layer transceivers for communication with any one of the other devices 12, 20, and/or 22; the device interface circuit 40 also can include an IEEE based Ethernet transceiver for communications with the devices of FIG. 1 via any of the links 24, 26, 28, and/or 30 (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 20, and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
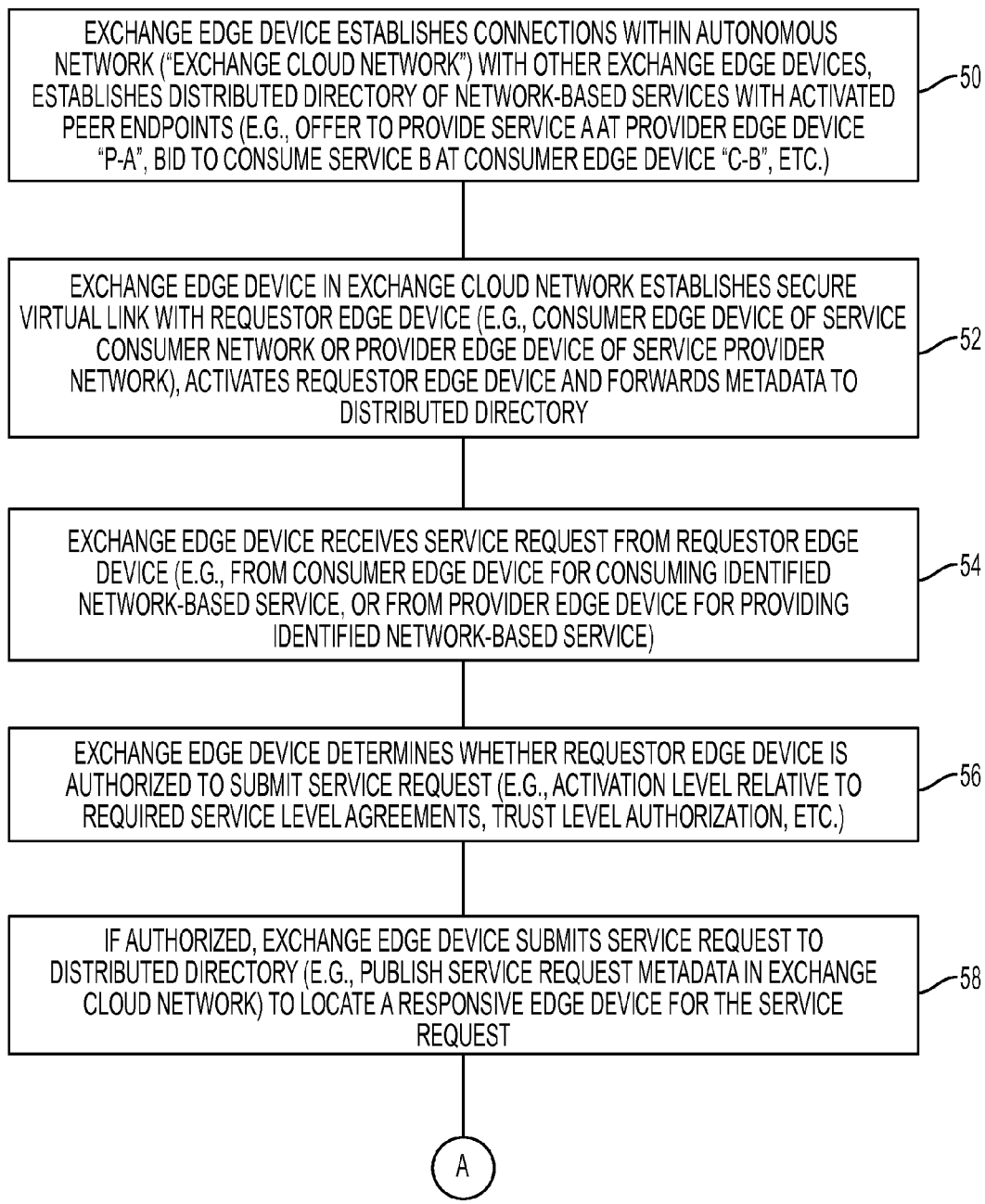
FIGS. 4A and 4B illustrate a method of enabling an identified network service between autonomous networks, according to an example embodiment.
Figure 4B:
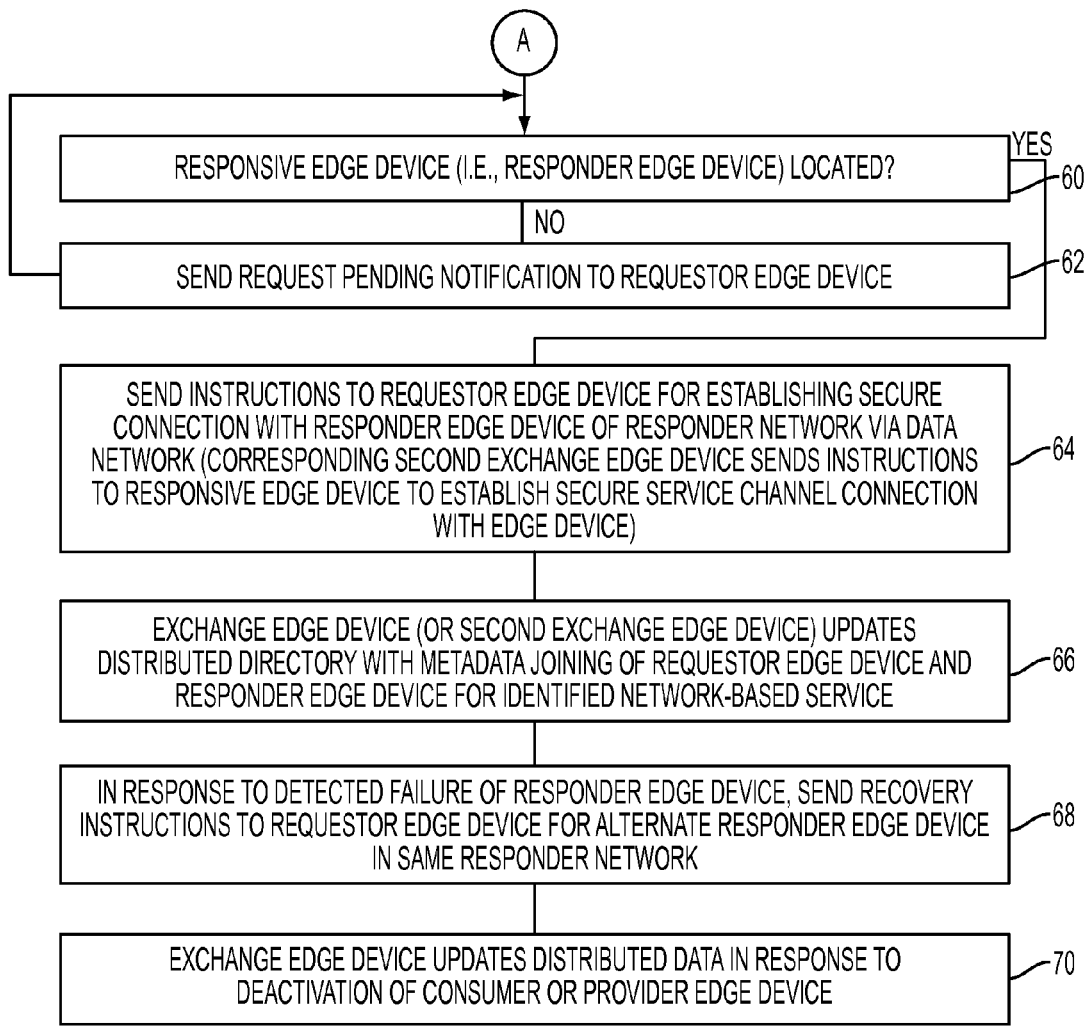

FIGS. 4A and 4B illustrate an example method of enabling an identified network service between autonomous networks 16 and 18, according to an example embodiment. The operations described in any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4A, the processor circuit 42 of each exchange edge device 12 in operation 50 can establish exchange links 34 with other exchange edge devices 12 within the autonomous network 14. The exchange edge devices 12 in operation 50 can establish a distributed directory 36 of network-based services 38 with activated consumer edge devices 20 and/or provider edge devices 22, based on sharing metadata for each transaction with an edge device 20 and/or 22. The distributed directory 36 can be distributed among the different exchange edge devices 12 based on storage in the corresponding local memory circuit 44, storage in a locally-accessible mass storage device, etc. The distributed directory 36 also can be implemented as a single database file stored in a single exchange edge device 12, for example in cases where only a single exchange edge device 12 is used in the service exchange network 14.

Figure 5:
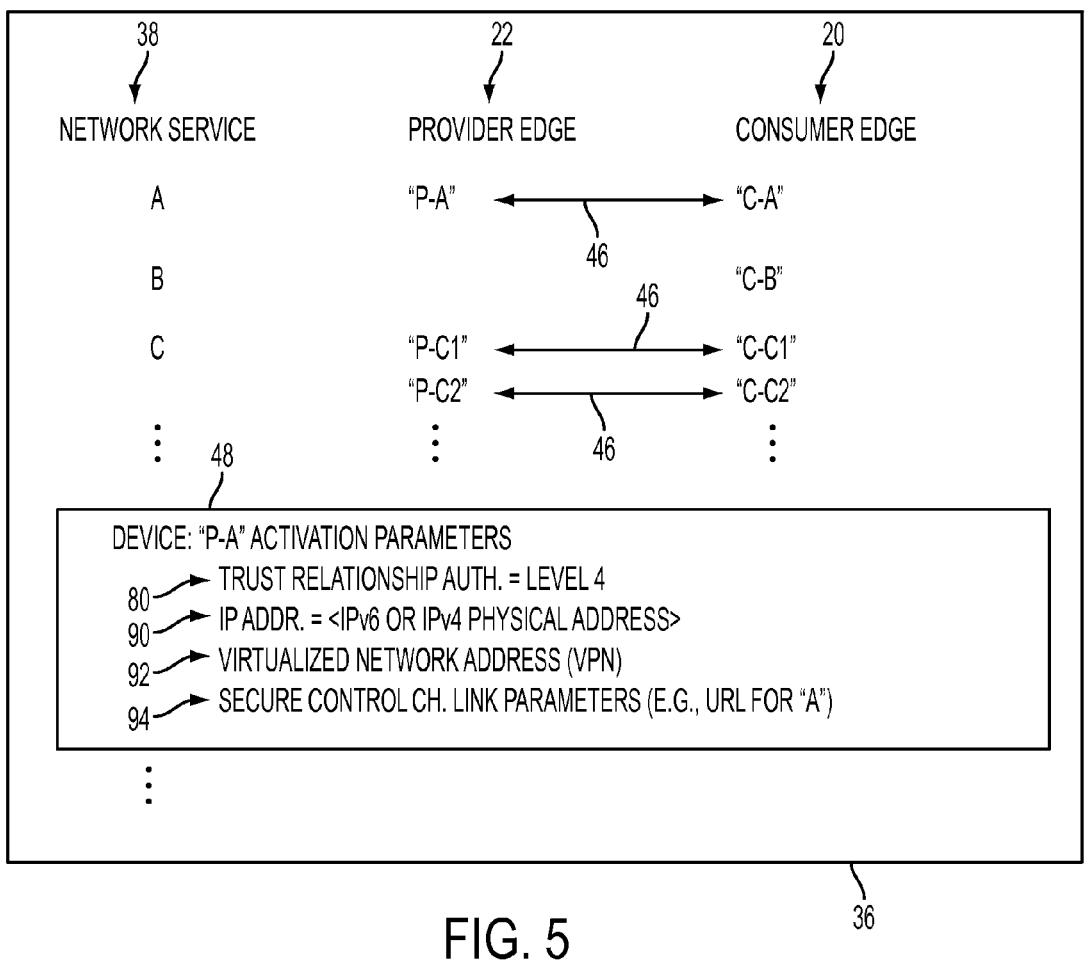
FIG. 5 illustrates a data structure stored in any one of the exchange edge devices of FIG. 2, for distribution of service request metadata in the exchange network of FIG. 2, according to an example embodiment.

FIG. 5 illustrates a data structure stored in any one of the exchange edge devices of FIG. 2, for distribution of service request metadata in the exchange network of FIG. 2, according to an example embodiment. As illustrated in FIG. 5, the distributed directory 36 can store an identification of desired network-based services 38, any provider edge device 22 capable of providing the desired network-based service 38, and/or any consumer edge device 20 requesting to consume the desired network-based service 38. FIG. 5 illustrates that the distributed directory 36 also can store identified pairings 46 between a consumer edge device 20 and a provider edge device 22, and activation parameters 48 for each requestor edge device (e.g. consumer edge device 20 and/or provider edge device 22).

Referring to FIG. 4A, the device interface circuit 40 of an exchange edge device 12 can be configured for establishing a secure control link 24/26 with a requestor edge device 20/22 in operation 52 based on execution of a peer-to-peer connection endpoint 84 by the processor circuit 42. The processor circuit 42 of the exchange edge device 12 can be configured for initiating an activation procedure with the requestor edge device 20/22 in order to authorize the requestor edge device 20/22 to submit a service request to the service exchange network 14. For example, the processor circuit 42 of the exchange edge device 12 can establish a prescribed trust relationship level 80 with the requestor edge device 20/22 based on a prescribed trust mediation 82 executed by the processor circuit 42 of the requestor edge device 20/22 and the processor circuit 42 of the exchange edge device 12: in particular, the requestor edge device 20/20 may gain greater levels of access depending on a higher level of trust as negotiated with the trust mediation 82 executed by the processor circuit 42 of the exchange edge device 12. Other activation parameters established by the exchange edge device 12 include the physical network address 90 of the requestor edge device 20/22 in the data network 32, the virtualized network address 92 negotiated by the peer-to-peer connection endpoint 84, and secure control channel link parameters 94 used to enable virtualized access of the identified network-based service 38 via the service delivery point 86 or service access point 88.

The metadata associated with the activation of the requestor edge device 20/22 is stored by the processor circuit 42 in the distributed directory 36 in operation 52, enabling the requestor edge device 20/22 to become an "authorized participant" in receiving instructions for establishing a network-based service with a counterparty edge device 20/22 upon identification in operation 60, described below with respect to FIG. 4B.

The processor circuit 42 of the exchange edge device 12 receives in operation 54 a service request from the requestor edge device 20/22 via the associated secure control link 24/26, for example a request for consuming an identified network-based service 38 from a consumer edge device 20, or a request from a provider edge device 22 to "publish" the availability of the identified network-based service 38. The processor circuit 42 of the exchange edge device 12 determines in operation 56 whether the requestor edge device 20/22 is authorized to submit the service request relative to the activation parameters 48 associated with the requestor edge device 20/22, including whether the service request satisfies the trust relationship level 80 granted to the requestor edge device 20/22, whether the service request satisfies a prescribed service level agreement (SLA) associated with the activation parameters 48 (or whether the SLA requirements for the service request exceeds the activation level as specified in the activation parameters 48), etc.

If in operation 58 the processor circuit 42 of the exchange edge device 12 determines that the requestor edge device 20/22 is authorized to submit the service request to the service exchange network 14 relative to the activation parameters 48, the processor circuit 42 of the exchange edge device 12 can submit the service request to the distributed directory 36 to locate a responsive edge device for the service request. If in operation 58 the processor circuit 42 of the exchange edge device 12 determines that the requestor edge device 20/22 is not authorized to submit the service request to the service exchange network 14, for example if the service request requirements exceed the activation parameters 48 granted to the requestor edge device 20/22, the processor circuit 42 of the exchange edge device 12 can either reject the service request, or send a message prompting the requestor edge device 20/22 to execute an on-demand upgrade to its activation parameters 48 to accommodate the service request.

Referring to FIG. 4B, the processor circuit 42 of the exchange edge device 12 determines in operation 60 whether the distributed directory 36 includes an entry identifying that a responder edge device is available to respond to the service request. If no responsive edge device is available, the processor circuit 42 of the exchange edge device 12 can create a notification message to the requestor edge device 20/22 in operation 62 indicating that the service request is pending (i.e., waiting for a responsive edge device).

If in operation the processor circuit 42 of the exchange edge device 12 identifies a responsive edge device for the service request, the processor circuit 42 of the exchange edge device 12 in operation 64 can send to the requestor edge device 20/22, via the corresponding secure control link 24/26, instructions for establishing a secure connection 30 and a secure service channel 28 with the responder edge device providing an endpoint 86 or 88 for a responder network 16/18 that is responsive to the service request. The instructions can include, for example, identification of the endpoints 86 and 88, prescribed service protocol and service port, relevant connection parameters such as the network address 90 and/or virtualized network address 92 for establishing the secure peer-to-peer network link 30 and the secure service channel 28, plus any necessary secure control channel link parameters 94 such as a service source identifier for the URL mediation 98 and service-channel access identifier (e.g., a Uniform Resource Identifier (URI)) necessary to access the service access point 88 or service delivery point 86 of the responder edge device for the identified network-based service 38. The access of services using the service-channel access identifier can be managed across the secure service channel 28 by Uniform Resource Locator (URL) mediation 98 executed by the processor circuits 42 in the consumer edge device 20 and the provider edge device 22. The URL mediation 98 enables the mutual isolation of the services internal to the respective networks 16 and 18, preventing mutual direct access into the respective networks 16 and 18. Hence each edge device 20 and 22 can independently manage its internal network used for service consumption and/or providing, without interference from the peer edge device 20/22.

If the responder edge device is connected to a second exchange edge device 12, the processor circuit 42 of the exchange edge device 12 can send a notification to the second exchange edge device 12, enabling the second exchange edge device 12 to send a corresponding instruction to the responder edge device to establish the secure peer-to-peer network link 30 and the secure service channel 28 with the requestor edge device 20/22. The information from the exchange edge device(s) 12 enables the requestor and responder edge devices to establish the secure service channel 28 overlying the secure peer-to-peer network link 30; the information from the exchange edge device(s) 12 also can enable the requestor and responder edge devices to recover from recoverable link failures, renegotiate service level agreements, etc., which can minimize the reliance on the exchange edge devices 12 once the secure service channel 28 is initially established.

Instead of sending the instructions to both the requestor edge device 20/22 and the responder edge device for establishing the secure communications 28 and/or 30, the exchange edge device 12 in an alternate embodiment can send the instructions to a first edge device (e.g., the responder edge device) along with one or more secure tokens that enable the second edge device (e.g., the requestor edge device 20/22) to authenticate the first edge device as responsive to the service request sent by the second edge device 20/22 to the associated exchange device 12. In this alternate embodiment, the requestor edge device 20/22 (or another network element in the associated network 16/18) can dynamically generate a secure token (or at least a part thereof) associated with the original service request; the requestor edge device 20/22 can supply the secure token (or at least the part thereof) to the associated exchange device 12 as part of the original service request, enabling the exchange device 12 to store the secure token as part of the associated metadata for the service request. Consequently, in response to receiving the instructions containing the one or more tokens, the responder edge device can initiate a connection request that includes the one or more secure tokens (e.g., a first secure token supplied by the requestor edge device 20/22 for the service request, and a second secure token generated in the service exchange network 14 to authenticate the responder edge device as trusted by the service exchange network 14): the requestor edge device 20/22 can authenticate the responder edge device as a trusted entity (i.e., trusted by the service exchange network 14) that is responsive to the service request based on the one or more secure tokens. Hence, this alternate embodiment can enable the establishment of the identified network service between the autonomous networks 16 and 18 based on sending a single instruction to one of the network edge devices 20 or 22 along with authentication information, without the necessity of sending an instruction to both of the network edge devices 20 or 22.

The exchange edge device 12 can include a monitor 96 that can manage the status of the connected edge devices 20 and/or 22, and the associated control links 24/26, enabling the processor circuit 42 of the exchange edge device 12 in operation 66 to update the distributed directory 36 to indicate pairing 46 of the requestor edge device 20/22 and the responder edge device as provider-consumer peers for the requested network-based service 38. The event of updating the distributed directory 36 with the pairing 46 also can initiate separate and distinct billing procedures associated with the service level agreements of the requestor edge device 20/22 and the responder edge device, for example by an Operations Support System (OSS)/Business Support System (BSS).

The processor circuit 42 executing the monitor 96 in the exchange edge device 12 also can detect in operation 68 if there is a detected failure in the responder edge device of the responder network responding to the service request of operation 66. In response to the detected failure, the processor circuit 42 can determine if the responder network has an alternate responder edge device in the same responder network (e.g., in a multi-homed network), and in response send recovery instructions to the requestor edge device 20/22 (and the corresponding exchange edge device 12 serving the alternate responder edge device 20/22) to establish a new secure peer-to-peer network link 30 and secure service channel 28 to resume the provider-consumer delivery of the network-based service 38. The processor circuit 42 of the exchange edge device(s) 12 also can send the instructions regarding the alternate responder edge device 20/22 as part of the instructions sent in operation 64, enabling the requestor edge device to initiate the failover operation with the alternate responder edge device 20/22 in response to the requestor edge device detecting the failure and without further instructions required from the exchange edge device 12.

The processor circuit 42 executing the monitor 96 in the exchange edge device 12 also can detect in operation 70 if deactivation of a consumer edge device 20 or provider edge device 22 is required (e.g., for business or technical reasons), and update the distributed directory 36 accordingly.

According to example embodiments, a secure service exchange network is established as an autonomous network that is independent and distinct from other autonomous networks operating as service consumer networks and service provider networks, respectively. The secure service exchange network can maintain a secure and trusted relationship between the service consumer networks and service provider networks, enabling real-time management of on-demand service delivery between service consumer networks and service provider networks that can utilize their existing internal IT infrastructure within their administrative domain.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a network edge device in a first autonomous network, whether a second network edge device in a second autonomous network is authorized to submit a service request to the first autonomous network, the service request associated with one of providing or consuming an identified network-based service;
   identifying, by the network edge device within the first autonomous network, a third network edge device in a third autonomous network and identified as responsive to the service request for the identified network-based service; and
   sending instructions for establishing a secure communications between the second network edge device and the third network edge device via a data network distinct from the first, second, or third autonomous networks, for establishment of the identified network-based service between the second autonomous network and the third autonomous network via the data network;
   wherein the determining whether the second network edge device is authorized to submit the service request is based on whether the second network edge device has been activated within the first autonomous network, including an identification of:
   whether the second network edge device has been authorized for a prescribed trust relationship,
   a physical network address for the second network edge device,
   a virtualized network address allocated to the second network edge device for communications with the network edge device, and
   secure control channel link parameters for establishing a secure connection between the network edge device and the second network edge device as a peer-to-peer connection endpoints.

2. The method of claim 1, further comprising the network edge device and the second network edge device establishing a secure connection as peer-to-peer connection endpoints, and the network edge device receiving the service request from the second network edge device via the secure connection.

3. The method of claim 1, wherein the instructions for the secure communications enable on-demand establishment of a secure service channel overlying a secure peer-to-peer network link between the second network edge device and the third network edge device for the identified network-based service.

4. The method of claim 3, wherein the instructions for on-demand establishment of a secure service channel include identifying the second network edge device as a service provider endpoint, the third network edge device as a service consumer endpoint, a prescribed service protocol and service port, a service source identifier, and a service access identifier, enabling the third network edge device as the service consumer endpoint to access the identified network-based service from the second autonomous network via the secure service channel.

5. The method of claim 1, wherein the identifying includes submitting at least metadata associated with the service request to a distributed directory of network-based services, the distributed directory maintained in the first autonomous network and storing information associated with providers and consumers of the network-based services.

6. The method of claim 1, further comprising the network edge device sending recovery instructions to the second network edge device, for re-establishing the identified network-based service by the third autonomous network, with a fourth network edge device in the third autonomous network in response to a detected failure of the third network edge device.

7. An apparatus comprising:
   a device interface circuit configured for communications inside and outside a first autonomous network, the apparatus configured for operation as a network edge device in the first autonomous network; and
   a processor circuit configured for:
   determining whether a second network edge device in a second autonomous network is authorized to submit a service request to the first autonomous network, the service request associated with one of providing or consuming an identified network-based service,
   identifying a third network edge device in a third autonomous network and identified as responsive to the service request for the identified network-based service, and
   sending instructions for establishing a secure communications between the second network edge device and the third network edge device via a data network distinct from the first, second, or third autonomous networks, for establishment of the identified network-based service between the second autonomous network and the third autonomous network via the data network;
   wherein the processor circuit is configured for determining whether the second network edge device is authorized to submit the service request based on determining whether the second network edge device has been activated within the first autonomous network, including an identification of:
   whether the second network edge device has been authorized for a prescribed trust relationship,
   a physical network address for the second network edge device,
   a virtualized network address allocated to the second network edge device for communications with the network edge device, and
   secure control channel link parameters for establishing a secure connection between the network edge device and the second network edge device as a peer-to-peer connection endpoints.

8. The apparatus of claim 7, wherein the device interface circuit is configured for establishing a secure connection as a peer-to-peer connection endpoint with the second network edge device, the device interface circuit configured for receiving the service request from the second network edge device via the secure connection.

9. The apparatus of claim 7, wherein the instructions for the secure communications enable on-demand establishment of a secure service channel overlying a secure peer-to-peer network link between the second network edge device and the third network edge device for the identified network-based service.

10. The apparatus of claim 9, wherein the instructions for on-demand establishment of a secure service channel include identifying the second network edge device as a service provider endpoint, the third network edge device as a service consumer endpoint, a prescribed service protocol and service port, a service source identifier, and a service access identifier, enabling the third network edge device as the service consumer endpoint to access the identified network-based service from the second autonomous network via the secure service channel.

11. The apparatus of claim 7, wherein the processor circuit is configured for submitting at least metadata associated with the service request to a distributed directory of network-based services, the distributed directory maintained in the first autonomous network and storing information associated with providers and consumers of the network-based services.

12. The apparatus of claim 7, wherein the processor circuit is configured for sending recovery instructions to the second network edge device, for re-establishing the identified network-based service by the third autonomous network, with a fourth network edge device in the third autonomous network in response to a detected failure of the third network edge device.

13. Logic encoded in one or more non-transitory tangible media for execution by a machine and when executed by the machine operable for:

determining, by a network edge device in a first autonomous network, whether a second network edge device in a second autonomous network is authorized to submit a service request to the first autonomous network, the service request associated with one of providing or consuming an identified network-based service;

identifying, by the network edge device within the first autonomous network, a third network edge device in a third autonomous network and identified as responsive to the service request for the identified network-based service; and sending instructions for establishing a secure communications between the second network edge device and the third network edge device via a data network distinct from the first, second, or third autonomous networks, for establishment of the identified network-based service between the second autonomous network and the third autonomous network via the data network;

wherein the determining whether the second network edge device is authorized to submit the service request is based on whether the second network edge device has been activated within the first autonomous network, including an identification of:

whether the second network edge device has been authorized for a prescribed trust relationship, a physical network address for the second network edge device, a virtualized network address allocated to the second network edge device for communications with the network edge device, and secure control channel link parameters for establishing a secure connection between the network edge device and the second network edge device as a peer-to-peer connection endpoints.

14. The logic of claim 13, further operable for the network edge device and the second network edge device establishing a secure connection as peer-to-peer connection endpoints, and the network edge device receiving the service request from the second network edge device via the secure connection.

15. The logic of claim 13, wherein the instructions for the secure communications enable on-demand establishment of a secure service channel overlying a secure peer-to-peer network link between the second network edge device and the third network edge device for the identified network-based service.

16. The logic of claim 15, wherein the instructions for on-demand establishment of a secure service channel include identifying the second network edge device as a service provider endpoint, the third network edge device as a service consumer endpoint, a prescribed service protocol and service port, a service source identifier, and a service access identifier, enabling the third network edge device as the service consumer endpoint to access the identified network-based service from the second autonomous network via the secure service channel.

17. The logic of claim 13, wherein the identifying includes submitting at least metadata associated with the service request to a distributed directory of network-based services, the distributed directory maintained in the first autonomous network and storing information associated with providers and consumers of the network-based services.

18. The logic of claim 13, operable for the network edge device sending recovery instructions to the second network edge device, for re-establishing the identified network-based service by the third autonomous network, with a fourth network edge device in the third autonomous network in response to a detected failure of the third network edge device.

* * * * *

UNITED STATES PATENT AND TRADEMARK OFFICE
CERTIFICATE OF CORRECTION

PATENT NO. : 9,608,840 B2
APPLICATION NO. : 14/499687
DATED : March 28, 2017
INVENTOR(S) : Ravi et al.

Page 1 of 1

It is certified that error appears in the above-identified patent and that said Letters Patent is hereby corrected as shown below:

In the Claims

Column 11, Line 46, Claim 1 delete the word "a"

Column 12, Line 54, Claim 7 delete the word "a"

Column 14, Line 12, Claim 13 delete the word "a"

Signed and Sealed this
Sixth Day of February, 2018

Joseph Matal
*Performing the Functions and Duties of the
Under Secretary of Commerce for Intellectual Property and
Director of the United States Patent and Trademark Office*